United States Patent [19]
Auerbach

[11] 3,834,230
[45] Sept. 10, 1974

[54] SYSTEM FOR THE PROPORTIONAL EVALUATION OF QUANTITATIVE FLOW OF FLUIDS

[76] Inventor: David Auerbach, 117 Derech Harhalom, Tel-Aviv, Israel

[22] Filed: Aug. 31, 1972

[21] Appl. No.: 285,887

[52] U.S. Cl. ............................................... 73/199
[51] Int. Cl. ............................................. G01f 1/00
[58] Field of Search ............................. 73/199, 203

[56] References Cited
UNITED STATES PATENTS

| | | | |
|---|---|---|---|
| 2,189,750 | 2/1940 | Barge | 73/199 X |
| 2,307,888 | 1/1943 | Highfield | 73/199 X |
| 3,395,579 | 8/1968 | Stoten | 73/199 |

*Primary Examiner*—Herbert Goldstein
*Attorney, Agent, or Firm*—Charles W. Helzer

[57] ABSTRACT

A system for the proportional evaluation of quantitative fluid flow through a supply line to a receiver, includes a meter in the supply line that is bypassed by a line having therein a regulator valve controlled by the pressure upstream of the meter and bypass. The meter is calibrated so that for each unit of actual flow through the supply line at any pressure it will continuously show proportional quantities according to the desired rate per unit fixed by the supplier.

11 Claims, 1 Drawing Figure

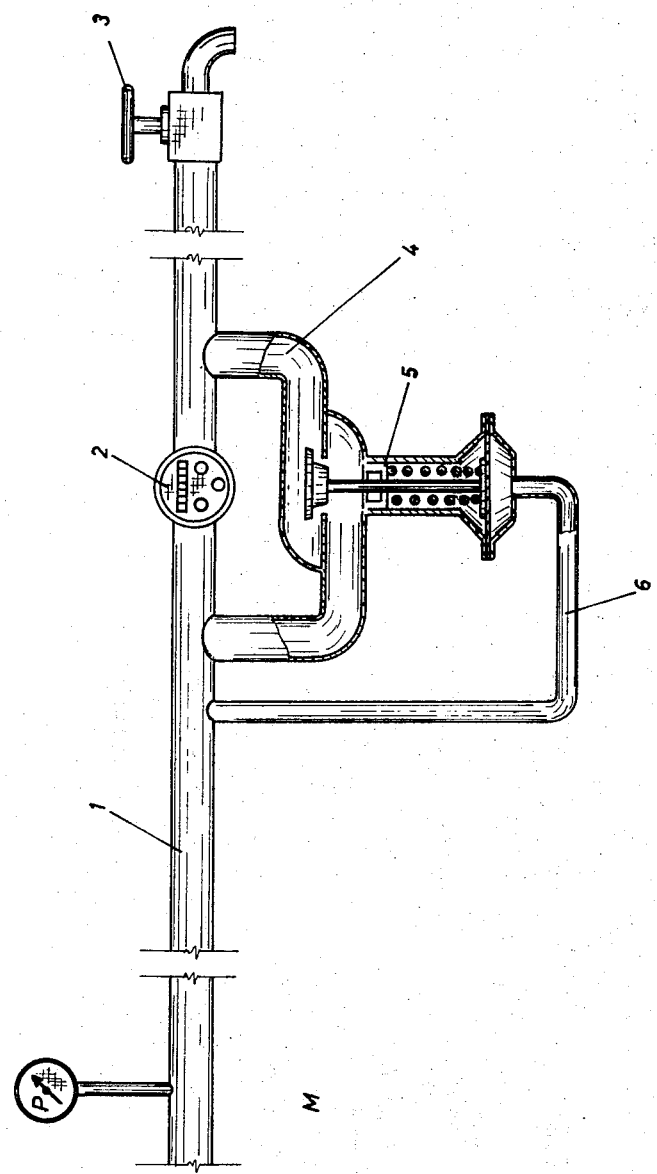

SYSTEM FOR THE PROPORTIONAL EVALUATION OF QUANTITATIVE FLOW OF FLUIDS

BACKGROUND OF THE INVENTION

Fluids, whether they be gas or liquid, are supplied to consumers through lines in many different fields, such as oil and gas pipelines, and water lines to individual consumers, or to distributors. As a specific example of a preferred embodiment, the distribution of water will be considered although such is to be in no way construed as a limitation of usage. In general, water is supplied in a network to be consumed by households, farms and the like within the network according to a definite pattern, that is there is usually a steady consumption of water during the day and a peak consumption of water during certain evening hours with respect to the entire network. During this peak consumption, the water pressure is reduced considerably, so that the water flow to the consumers premises is often reduced to an unsatisfactory degree, for example a trickle with concomitant annoyance of the customer. In addition to mere annoyance, the reduction in water pressure during such peak consumption may have serious economic consequences. For example, if the water is being used for the irrigation of agricultural fields, the irrigator may be under the erroneously assumption that the actual irrigating range of the sprinklers is far enough to irrigate the entire agricultural field according to their normal range, when in fact the actual range may be considerably less due to the peak consumption low pressure, with the result that a significant percentage of the crops will dry up and be spoiled.

SUMMARY OF THE INVENTION

It is an object of the present invention to overcome the problems associated with the wide range between peak and minimum consumption of flowing fluids supplied to many different consumers in a fluid network by reducing this peak to minimum range.

According to human psychology, it has been found that when the price for a unit of water is increased, a consumer will try to use only the most necessary quantity and will try not to waste any. This psychology is certainly true of other fluids being consumed and there will be a tendency on the part of the consumer to regulate his usage so that there will be more usage during periods when the unit price is reduced.

The present invention has recognized that this psychology exists and employed it in the development of a system in which during normal consumption, that is when the pressure within the network is normal, the metered quantity per unit quantity of water actually used is a predetermined amount, while during peak consumption, that is when the pressure is considerably less than normal, the metered quantity will be higher per unit of water actually consumed. In other words, the system of the present invention measures the quantity of water consumed in such a manner that a consumer must pay more for his water usage per unit of water during the peak hours than during hours of normal consumption, and with this system it is contemplated that peak consumption will become less so that the network can carry the flow required under all conditions without an unsatisfactory drop in fluid pressure.

In much of the discussion concerning the present invention and particularly with reference to the preferred embodiment, water will be the fluid employed. However, the present invention is equally applicable to other types of fluids, that is gases and liquids.

With the present invention, there is a proportional evaluation of the quantitative flow of water, by the provision of at least one supply line to a consumer having therein a meter for determining the consumer billing, a bypass line around the meter, and a flow regulator within the bypass line responsive to upstream supply line fluid pressure to directly control the flow of fluid through the bypass line in response to upstream pressure; the meter is calibrated in such a manner that for each unit of actual flow at any pressure through the supply line, it will continuously show proportional quantities according to the desired rate per unit flow fixed by the supplier.

BRIEF DESCRIPTION OF THE DRAWING

Further objects, features and advantages of the present invention will become more clear from the following detailed description of a preferred embodiment shown in the drawing, wherein the single FIGURE shows a somewhat schematic representation of a supply line branch to a consumer, which is a part of a total network having many such supply lines respectively for the number of consumers involved, which supply lines will branch from main supply lines leading ultimately to the fluid supplier.

As shown in the drawing, a main supply line M of fluid under pressure to be fed to the network of individual supply lines leading to the corresponding individual consumers will have an actual pressure as determined by the gauge P dependent upon usage by the consumers, which usually follows a predetermined pattern between average or normal consumption and peak consumption. One of the many supply lines 1 to an individual consumer is provided with a usage meter 2 to determine the usage billing to the consumer, and the supply line 1 is fluid interposed between the main supply line M and the consumer, which is schematically represented by a faucet 3. A bypass line 4 extends around the meter 2 and operatively therein is a flow regulating valve 5, so that some of the fluid traveling from left to right in the supply line 1 will pass through the bypass line 4, when the valve 5 is at least partially open, so that this part will not pass through the meter 2. In the preferred embodiment, the valve 5 has a movable valve member that is spring biased to its closed position and actuatable to an open position by a diaphragm that is operated on by the pressure of the fluid in the supply line 1 upstream of the bypass as communicated by the line 6.

The regulator valve 5 may be of any type that is preferably pressure pilot controlled, and it is particularly desirable that the regulator valve 5 react linearly to changes in pressure, particularly so that its degree of opening will be proportional to the upstream pressure within a predetermined pressure range. The diameter of the bypass line 4 will be made according to calculations as will become more clear hereinafter.

OPERATION

The system of the present invention operates as follows. Under normal usage or consumption within the network, when the pressure within line 1 is maximum or within a wholly satisfactory upper pressure range, the valve 5 will be fully open so that a percentage of the water traveling in supply line 1 from the main M to the point of usage 3 will pass through the bypass line 4 and the remaining percentage will pass through the meter 2, with the consumer receiving the quantity made up of both of these parts or percentages. For purposes of analysis, if the diameter of the bypass line 4 is the same as that of the supply line 1 and if all friction losses or other irregularities are ignored, one-half of the fluid quantity flowing through supply line 1 will flow through meter 2 and the other half of the fluid quantity flowing through the supply line 1 will flow through bypass line 4. When the upstream pressure, which would be very close to the main pressure is at a minimum, for example during peak consumption, the valve 5 will be automatically completely closed by its spring bias against the reduced pressure acting on the diaphragm so that the entire fluid quantity flowing through the supply line 1 will flow through the meter 2 to the consumer at 3.

If in the above example for purposes of analysis, it is desired to have the consumer pay twice as much for the fluid, particularly water, during peak consumption time when the pressure is at a minimum as compared to what he would pay for fluid during times of normal usage and pressure, the meter may be calibrated so that for each unit of fluid passing through the meter, it will register two units of fluid. For example, if a gallon of water passes through the meter 2, it may be calibrated to actually register the passage of 2 gallons of water. During normal usage hours when the water pressure is satisfactory, only one-half of the water received by the consumer, for example one-half of a gallon per unit of time will flow through the meter while the other half of a gallon per unit of time will flow through the bypass line 4, because the upstream pressure fed by line 6 will be sufficient to open the valve 5 against the bias of its spring. Since the meter is calibrated as mentioned above to show twice the actual flow through it, it will show the flow of 1 gallon per unit of time, which is the actual combined flow through the meter and bypass line 4 reaching the consumer at 3, although as mentioned the actual flow through the meter will be one-half the measured quantity. During peak consumption when the pressure drops below a predetermined value, the upstream pressure fed by line 6 to the diaphragm will be insufficient to hold the valve open against the bias of its spring, so that the valve 5 will close and prevent flow of fluid through the bypass line 4; under these conditions, the meter 2 will register twice the actual flow of fluid that reaches the consumer at 3. Thus, the billing rate for fluid actually consumed at 3 will be twice the normal rate during peak consumption periods when fluid pressure within the main is reduced.

If any other rate of payment per unit of fluid consumed is desired, the meter may be calibrated accordingly so that it will correspond with the rate for unit consumption fixed by the supplier. While the above example for line pipe diameters was for purposes of analysis set up with the condition that friction and the like irregularities be ignored, the actual calibration of the meter may be easily accomplished by known fluid flow principles taking into consideration all pressure drops within the lines caused by friction, irregularities, pipe diameters and the like so that the flow may be proportioned accordingly. Further, with the valve 5 opening prefereably linearly with respect to changes in pressure, there will be intermediate valve positions between fully open and fully closed for intermediate fluid flow proportioning. That is, if one-half of the fluid flows through meter 2 when the valve is fully open, the valve may be such that perhaps three-quarters of the fluid flows through meter 2 with the valve one-half closed, while of course the entire flow will be through meter 2 with the valve fully closed.

The control of the fluid in the bypass may, as has been described, be by way of a diaphragm valve actuated by the pressure upstream in the supply line, preferably close to the bypass. However, the control of the fluid within the bypass line may also be effected automatically by a remote control at any point in the main, so that the pressure drop by the individual customer will have no effect, for example the pressure within the main M, as determined by the gauge P may be used as the controlling pressure for the bypass regulator valve, with communication between these points being by any means. Instead of a diaphragm valve, any other valve acting continuously according to changes in pressure may be used.

While a preferred embodiment has been specifically described for purposes of illustration, with variations, further embodiments, variations and modifications are contemplated within the spirit and scope of the present invention as determined by the following claims.

What is claimed is:

1. In a system for the proportional evaluation of quantitative fluid flow between a supply of fluid and a point of usage through a fluid supply system including at least one supply line; the improvement comprising a fluid flow meter for connection within said supply line; bypass line means for fluid connection to said supply line upstream and downstream of said meter for bypassing fluid flow around the meter and allowing fluid to flow directly to the point of usage without passing through the meter; fluid flow regulating means connected within said bypass line means for controlling the flow of fluid within said bypass line means; and fluid pressure sensing means for connection to said fluid supply system upstream from said meter and controlling operation of said fluid flow regulating means in response only to fluid pressure upstream of said meter for increasing the proportional fluid flow through said bypass line with increasing upstream fluid pressure and decreasing the proportional fluid flow through said bypass line means with decreasing upstream fluid pressure.

2. The system of claim 1, wherein said fluid flow regulating means is movable between its fully open and fully closed position in direct linear correlation to upstream pressure within a predetermined pressure range.

3. The system according to claim 1, wherein said fluid flow regulating means includes a diaphragm actuator and said fluid pressure sensing means supplies fluid under pressure from closely adjacent the upstream end of said bypass line means to said diaphragm to control said fluid flow regulating means.

4. The system of claim 1, wherein said fluid flow regulating means includes a diaphragm actuator and said fluid pressure sensing means supplies fluid under pressure from a point in the fluid supply system remote from and upstream of said bypass line means.

5. The system of claim 1, wherein said fluid flow meter is calibrated to register a fluid flow substantially greater than the actual flow through it.

6. A system for supplying pressurized fluid from a source to a plurality of separate consumers where there is a tendency for peak consumer usage to unsatisfactorily drop the fluid pressure, comprising a fluid supply system including a plurality of supply lines individually serving respective ones of the consumers and being fluid connected in a network to the source of fluid under pressure; at least some of said supply lines each having a calibrated fluid flow meter, a bypass line around each said meter, flow control means within said bypass lines for controlling flow of fluid through said bypass lines, and means controlling the operation of said fluid flow control means automatically in response to pressure upstream of the fluid supply system for increasing fluid flow through the bypass line under conditions where the upstream fluid pressure of the system is at or above a predetermined level, and decreasing fluid flow through the bypass line upon the upstream fluid pressure dropping below the predetermined level.

7. The system of claim 6, wherein said meter is calibrated to register fluid flow at a predetermined substantial multiple of the actual fluid flow through said meter and to register actual fluid flow through its supply line to its consumer when said bypass line flow control means is fully open.

8. A method of supplying pressurized fluid through a network of supply lines from a source to a plurality of separate consumers where there is a tendency for peak consumer usage to unsatisfactorily drop the fluid pressure, comprising the steps of: measuring the flow of fluid through a section of an individual supply line to a consumer for a predetermined upstream fluid pressure, calibrating the actual flow through the section at a predetermined proportional rate at the predetermined upstream fluid pressure, bypassing a proportional amount of fluid around said supply line section upon the fluid pressure upstream of said section being maintained at or above the predetermined level and decreasing fluid bypass around said supply line section upon the upstream fluid pressure falling below the predetermined level.

9. The method of claim 8, including the additional steps of linearly controlling the quantity of fluid being bypassed around said supply line section in direct proportion only to the upstream pressure between said levels.

10. The method of claim 8, including the further step of calibrating a meter within the supply line section for the steps of determining and recording so that the recorded unit flow corresponds to actual unit flow only when the bypass line is fully open.

11. The method of claim 8, including repeating the above steps for each of a plurality of the supply lines for a corresponding plurality of consumers.

* * * * *